United States Patent
Antony et al.

(10) Patent No.: US 11,327,779 B2
(45) Date of Patent: May 10, 2022

(54) PARALLELIZED VIRTUAL MACHINE CONFIGURATION

(71) Applicant: VMWARE, INC., Palo Alto, CA (US)

(72) Inventors: Jinto Antony, Bangalore (IN); Sudhish P. T., Bangalore (IN); Madhusudhanan Gangadharan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 550 days.

(21) Appl. No.: 14/751,194

(22) Filed: Jun. 26, 2015

(65) Prior Publication Data
US 2016/0283257 A1 Sep. 29, 2016

(30) Foreign Application Priority Data
Mar. 25, 2015 (IN) .......................... 1541/CHE/2015

(51) Int. Cl.
*G06F 12/02* (2006.01)
*G06F 9/455* (2018.01)

(52) U.S. Cl.
CPC ...... *G06F 9/45533* (2013.01); *G06F 9/45541* (2013.01); *G06F 9/45558* (2013.01); *G06F 2009/45562* (2013.01); *G06F 2009/45575* (2013.01)

(58) Field of Classification Search
CPC .................................................. G06F 9/45533
See application file for complete search history.

(56) References Cited

U.S. PATENT DOCUMENTS

| | | | | |
|---|---|---|---|---|
| 6,961,843 B2 * | 11/2005 | O'Connor | ........... | G06F 9/30021 712/208 |
| 8,209,408 B1 * | 6/2012 | Huang | ................ | G06F 9/45558 709/223 |
| 9,047,108 B1 * | 6/2015 | Rajaa | .................... | G06F 9/4856 |
| 2003/0005114 A1 * | 1/2003 | Shavit | ................... | G06F 9/4493 709/225 |

(Continued)

OTHER PUBLICATIONS

"OS Image Management," Aug. 26, 2010, available at http://social.technet.microsoft.com/Forums/systemcenter/en-US/356df521-2fa3-4252-85e3-bf572fe382db/os-image-management.

*Primary Examiner* — Lewis A Bullock, Jr.
*Assistant Examiner* — Mohammad H Kabir
(74) *Attorney, Agent, or Firm* — Loza & Loza, LLP

(57) ABSTRACT

Techniques for facilitating parallelized configuration of multiple virtual machines. The techniques include duplicating commands received from an administrator and controlling the multiple virtual machines with those commands in a parallel manner. Different types of commands are treated differently. More specifically, commands for controlling software executing in the virtual machines are replicated and sent to each virtual machine. By contrast, commands for managing virtual machines themselves are provided to virtualization software like a hypervisor to be executed. Duplication of the commands for controlling software executing in the virtual machines is performed by an input/output multiplexer, which also has the function of combining display output from each of the virtual machines. More specifically, the input/output multiplexer displays a common display output to the administrator, where the common display output is the screen that is shown on each of the virtual machines.

20 Claims, 4 Drawing Sheets

(56) References Cited

U.S. PATENT DOCUMENTS

| | | | | |
|---|---|---|---|---|
| 2004/0122637 | A1* | 6/2004 | Askew | B64G 7/00 703/2 |
| 2006/0015674 | A1* | 1/2006 | Murotake | G06F 9/4401 711/101 |
| 2007/0277021 | A1* | 11/2007 | O'Connor | G06F 9/30021 712/208 |
| 2007/0297544 | A1* | 12/2007 | Choi | H04N 7/173 375/346 |
| 2009/0030931 | A1* | 1/2009 | Khivesara | H04N 7/163 |
| 2011/0016466 | A1* | 1/2011 | Liu | G06F 17/30067 718/1 |
| 2011/0154320 | A1* | 6/2011 | Verma | G06F 8/63 718/1 |
| 2011/0296411 | A1* | 12/2011 | Tang | G06F 9/45545 718/1 |
| 2012/0151232 | A1* | 6/2012 | Fish, III | G06F 15/7821 713/322 |
| 2012/0272241 | A1* | 10/2012 | Nonaka | G06F 9/5077 718/1 |
| 2013/0036324 | A1* | 2/2013 | Nagasawa | H04L 67/32 714/4.11 |
| 2013/0097369 | A1* | 4/2013 | Talagala | G06F 12/0246 711/103 |
| 2013/0155083 | A1* | 6/2013 | McKenzie | G06T 1/20 345/522 |
| 2013/0290979 | A1* | 10/2013 | Kawano | G06F 9/5083 718/104 |
| 2014/0068183 | A1* | 3/2014 | Joshi | G06F 12/0866 711/114 |
| 2014/0118362 | A1* | 5/2014 | Hakura | G06T 17/20 345/505 |
| 2014/0196029 | A1* | 7/2014 | Kannan | G06F 9/45504 718/1 |
| 2014/0201146 | A1* | 7/2014 | Kapsiar | G06F 17/30079 707/635 |
| 2014/0337845 | A1* | 11/2014 | Ling | G06F 9/45558 718/1 |
| 2015/0150118 | A1* | 5/2015 | Addepalli | G06F 12/145 726/17 |
| 2015/0350214 | A1* | 12/2015 | Gilpin | H04L 63/10 726/5 |
| 2016/0026492 | A1* | 1/2016 | Son | G06F 3/0604 718/1 |

* cited by examiner

PARALLELIZED VIRTUAL MACHINE CONFIGURATION

RELATED APPLICATIONS

Benefit is claimed under 35 U.S.C. 119(a)-(d) to Foreign application Serial No. 1541/CHE/2015 filed in India entitled "PARALLELIZED VIRTUAL MACHINE CONFIGURATION", on Mar. 25, 2015, by VMware, Inc., which is herein incorporated in its entirety by reference for all purposes.

BACKGROUND

Virtualized computing environments provide tremendous efficiency and flexibility for systems operators by enabling computing resources to be deployed and managed as needed to accommodate specific applications and capacity requirements. These virtualized computing environments generally enable management of multiple virtual machines (VMs), each of which acts as an individual, separate computing environment. The number of active VMs can be scaled up or down depending on the particular processing requirements.

In many situations, multiple VMs configured in the same manner may be required. In such situations, an administrator would need to configure each different VM. For example, after creating new VMs, an administrator may have to install and configure an operating system, install and configure application programs, and configure other aspects of the VM. In addition, different VMs may be associated with multiple different virtualization platforms. To configure the various VMs associated with different virtualization platforms, an administrator may have to be familiar with the commands and interface associated with the different virtualization platforms. The process of configuring multiple VMs in an identical manner may be tedious for an administrator.

As the foregoing illustrates, what is needed in the art are better techniques for configuring VMs.

SUMMARY

A method for parallelizing execution of configuration operations for to plurality of virtual machines is provided. The method includes identifying a first command for the plurality of virtual machines. The method also includes determining that the first command comprises an input/output command for execution by each virtual machine in the plurality of virtual machines. The method further includes replicating the first command for each of the virtual machines in the plurality of virtual machines to generate first replicated commands. The method also includes controlling each virtual machine of the plurality of virtual machines according to the first replicated commands via an input/output multiplexer.

Another method for parallelizing execution of operations for a plurality of virtual machines is provided. The method includes in response to receiving a command for mapping one or more virtual machines to an input/output multiplexer, mapping the one or more virtual machines to an input/output, multiplexer. The method also includes combining, via the input/output multiplexer, display data that are output from virtual machines mapped to the input/output multiplexer to generate combined display data. The method further includes displaying the combined display data. The method also includes in response to receiving an input/output command, duplicating the input/output command to generate duplicated input/output commands. The method further includes providing the duplicated input/output commands to the virtual machines mapped to the input/output multiplexer.

A system for parallelized execution of configuration operations for a plurality of virtual machines is provided. The system includes a central virtual machine console management module and an input/output multiplexer. The central virtual machine console includes a configuration manager and a virtual machine console display. The input/output multiplexer is coupled to the configuration manager and to the virtual machine console display. The input/output multiplexer is configured to in response to receiving a command for mapping one or more virtual machines to an input/output multiplexer, map the one or more virtual machines. The input/output multiplexer is also configured to combine display data that are output from virtual machines mapped to the input/output multiplexer to generate combined display data. The input/output multiplexer is further configured to in response to receiving an input/output command from the configuration manager, duplicate the input/output command to generate duplicated input/output commands. The input/output multiplexer is also configured to provide the duplicated input/output commands to the virtual machines mapped to the input/output multiplexer.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Provided herein is a system for facilitating parallelized configuration of multiple virtual machines. The system generally includes a central manager that provides an interface to an administrator for configuration of virtual machines. The central manager duplicates commands received from an administrator to control multiple virtual machines in a parallel manner. The system also includes one or more virtualization platforms that include hardware that execute virtual machines. The central manager receives a command from an administrator and, based on the nature of the command, determines how to execute the command in a parallelized manner. If the commands are for controlling virtualized software within the virtual machine environments (such as keyboard or mouse inputs), then the central manager duplicates these commands and transmits the commands to each virtual machine for execution. This transmission may be accomplished with the use of an application programming interface, which may translate the commands to a format that is understandable by the virtual machines. If the commands are for managing the virtual machines themselves, then the central manager transmits the commands to the virtualization platforms for execution. This transmission may be accomplished with the use of an application programming interface, which may translate the commands to a format that is understandable by the virtualization platforms. To display the status of the virtual machines to the administrator, the central manager combines the display outputs from each of the virtual machines and displays the combined output to the administrator. The administrator may also request execution of scripts which include commands for controlling virtualized software and for managing virtual machines and may also include control flow logic. The control flow logic may make determinations based on the combined display output, such as based on the state of various graphical user interface elements. The commands included within the scripts may be parallelized as with commands manually entered by the administrator, as described above.

Figure 1:
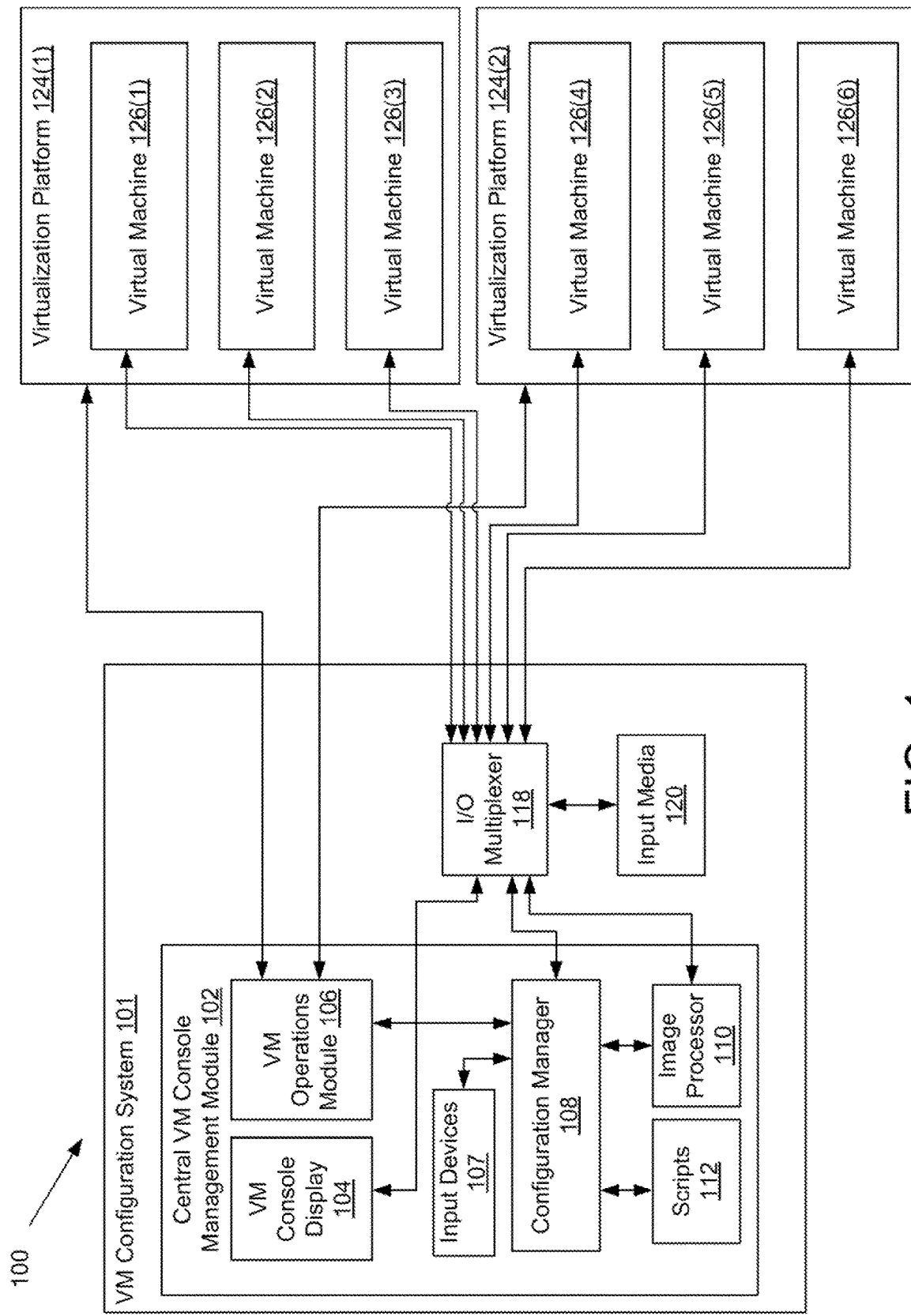
FIG. 1 is a block diagram of a virtual machine (VM) system, according to an embodiment.

FIG. 1 is a block diagram of a virtual machine (VM) system 100, accordion to an embodiment. As shown, the VM system 100 includes a VM configuration system 101 and one or more virtualization platforms 124 that execute virtual machines 126.

The VM configuration system 101 includes a central VM console management module 102, an input/output multiplexer 118 (I/O multiplexer), and an input media 120. Central VM console management module 102 (or "central manager 102") provides an interface for an administrator to configure the VMs 126 in a parallel manner, in order to save the administrator time and effort. Central manager 102 includes a VM console display 104 that displays pixels associated with output from VMs 126, input devices 107 that allow the administrator to provide input to VMs 126, and configuration manager 108, which assists with parallelized configuration of VMs 126. Central manager 102 also includes VM operations module 106, image processor 110, and scripts 112, which assist configuration manager 108 in performing parallelized configuration of VMs 126.

Configuration manager 108 controls the configuration of VMs 126 based on administrator input via input devices 107, based on scripts 112, and based on display data received from each VM 126 (via I/O multiplexer 118) and analyzed by image processor 110. Input devices 107 are devices for allowing an administrator to provide input to VM configuration system 101. Input devices 107 may include standard input devices such as a keyboard, mouse, and the like. Scripts 112 include one or more installation or configuration scripts that are pre-written and that are configured to instruct or direct configuration manager 108 to configure VMs 126. Commands generated based on either input devices 107 or scripts 112 may be output to control each of the VMs 126 so that configuration of multiple VMs 126 can be controlled at the same time and so that single inputs from an administrator (via input devices 107) or scripts 112 result in multiple parallel actions for VMs 126. An administrator may "attach" any number of VMs 126 to the input/output multiplexer 118 in order to replicate commands for those VMs 126. In various embodiment, multiplexer 118 replicates commands only for virtual machines 126 that are attached and, similarly, combines display only from virtual machines 126 that are attached.

To control VMs 126, configuration manager 108 generates two types of commands. A first type of commands—"VM software commands"—are commands directed to the virtualized software running in the VMs 126. VM software commands may include, for example, commands to the guest operating system being executed on the VMs 126, commands to the applications executing in the VMs 126, or the like. These VM software commands may include input provided via input devices such as a mouse and keyboard. For example, the VM software commands may include a mouse click and an associated screen location or a particular key press. VM software commands may also include other, more direct commands, such as commands to issue a "control-alt-delete" invocation, commands to get and set the screen size, and the like. A second type of commands—"VM management commands"—are commands for managing the execution of VMs 126 within virtualization platforms 124. VM management commands are generally directed to the virtualization platforms 124 (or, more specifically, to managing software associated with virtualization platforms 124), rather than to individual VMs 126. VM management commands may include commands for spawning new VMs 126, migrating VMS 126, or performing other VM-focused functions.

Configuration manager 108 transmits VM software commands to I/O multiplexer 118, which replicates the commands and transmits the replicated commands to each VM 126. I/O multiplexer 118 may communicate commands to VMs 126 via a VM software command API, an example of which is the Virtual Machine Remote Console (VMRC) API from VMware, Inc. The VMRC API provides functionality for handling the VM software commands. The VM software command API would control VMs 126 based on commands received from configuration manager 108. Each VM 126 would respond to a received command as specified by that command.

Configuration manager 108 transmits VM management commands to virtualization platforms 124 via VM operations module 106. VM operations module 106 may include or interface with a VM operation API, an example of which is the vSphere API from VMware, Inc. This VM operation API would control a particular virtualization platform 124 based on the VM management commands. Upon receiving a VM management command, each virtualization platform 124 would respond to that VM management command as specified. The VM management commands include commands for controlling the operation of VMs 126, as opposed to software executing within the VMs 126. Examples of VM management commands include commands for configuring, initializing, and executing virtual machines (such as a command to power a VM 126 on, to restart a VM 126, take a snapshot of a VM 126, attach a VM 126 to virtual media), commands for managing virtual networking constructs, commands for managing hosts (202 in FIG. 2) that execute VMs 126, and various other commands for managing the virtual environment in which VMs 126 execute. The vSphere API provides functionality for handling VM management commands.

To provide an administrator with display output, VM console display 104 displays a screen display corresponding to the screen displays received from each of the VMs 126. This screen display is a "consensus display" representative of the screen display corresponding to each of the different VMs 126. It is generally assumed that, using the techniques described herein, each of the VMs 126 will be configured together, from one particular common state (such as having no programs or operating system installed) to another common state (such as having an operating system and programs installed and configured). Thus, it is generally assumed that the screen displays corresponding to each of the VMs 126 can be identical or nearly identical at certain times. In some embodiments, if the display is not identical due to a small performance differences, VM console display 104 may wait for all VMs 126 to reach the same state before advancing to the next frame.

I/O multiplexer 118 combines display data received from VMs 126 for provision to VM console display 104, configuration manager 108, and image processor 110. I/O multiplexer 118 also replicates the VM software commands received from configuration manager 108 for provision to the VMs 126. I/O multiplexer 118 also replicates data received from input media 120, which generally stores installation and configuration software and data, for provision to VMs 126.

To provide the above-described "consensus display" to configuration manager 108, image processor 110, and VIM console display 104, I/O multiplexer 118 receives display information from VMs 126. The display information includes the pixels that would be displayed on a screen corresponding to each VM 126. For example, the display information may include pixel data illustrating an application window, along with elements within that application window such as a workspace area, toolbars, buttons, and the like, and may include pixel data illustrating other applications that are running on VM 126 as well as elements of the guest operating system that would be displayed on a screen for the VM 126. The display data transmitted to I/O multiplexer 118 may be organized into frames. I/O multiplexer 118 tracks the frames received from each virtual machine 126 and transmits a corresponding frame to configuration manager 108, VM console display 104, and image processor 110 when each of the virtual machines 126 has advanced to the next frame (which may be identical or nearly identical, differing in one or more screen elements). Thus, I/O multiplexer 118 waits until all VMs 126 have advanced to the next frame before transmitting that frame to VIA console display 104 and configuration manager 108.

I/O multiplexer 118 also receives commands from configuration manager 108 and transmits those commands to each VM 126. The received commands, which are VM software commands, may include emulated input device commands, such as a mouse click or release or a keyboard key press or release, and may also include other commands that are not emulated input device commands but instead are direct commands to applications or the operating system executing in the VMs 126. In one example, these commands may include pressing a particular graphical user interface (GUI) button. In such a case, configuration manager 108 would transmit a corresponding command to I/O multiplexer 118, which I/O multiplexer 118 then retransmits to VMs 126. In another example, these commands may include a key press of a particular keyboard key.

I/O multiplexer 118 also accepts data from input media 120 and transmits that data to each of the VMs 126 when instructed to do so by configuration manager 108. More specifically, configuration manager 108, upon being instructed by scripts 112 or by administrator via input devices 107 (or via another manner), may request data to be transmitted from input media 120 to the VMs 126. In response, I/O multiplexer 118 accesses data in input media 120 and transmits the accessed data to the VMs 126. Input media 120 may include any type of media that can store data. Examples of such media include compact disks, DVDs, flash memory, hard drives, disk images, and other types of storage media. The data may include data or software associated with an operation system, an application program, or other types of data. The input media 120 may be mounted to VM configuration system 101 as a virtual media such as a virtual compact disk read-only-memory (CDROM).

In operation, VM configuration system 101 allows an administrator to replicate operations across multiple VMs 126 for efficient VM 126 configuration. An administrator may enter commands via input devices 107 in order to control VMs 126. Configuration manager 108 would transmit these commands to I/O multiplexer 118, which transmits these commands to each of the VMs 126. In addition to entry, commands may also be provided to VMs 126 via pre-designed scripts 112. Configuration manager 108 reads and executes these scripts 112, which include particular commands that are provided by configuration manager 108 to VMs 126 via I/O multiplexer 118. When executing the scripts, configuration manager 108 may analyze, via image processor 110, the display data received via I/O multiplexer 118 to make layout determinations. These layout determinations may include the presence and location of buttons, menu items, icons, text fields, or other elements, so that configuration manager 108 may activate those elements to execute scripts 112.

While central manager 102 is performing parallel configuration operations as described above, users that would normally be allowed to access one or more VMs 126 are generally "locked out" or not permitted to access those VMs 126. However, in some instances, installation or configuration operations may dictate that information from a user is to be provided. One example is a user login and password combination. In such a situation, central manager 102 may either temporarily allow users to access the VMs 126 or may provide the user information directly. To provide that information directly, an administrator may, prior to performing the parallel configuration operations, request the user information in a secure manner, such as by using encryption or the like. Then, the administrator would have that information when that information is to be entered into the VMs 126.

Figure 2:
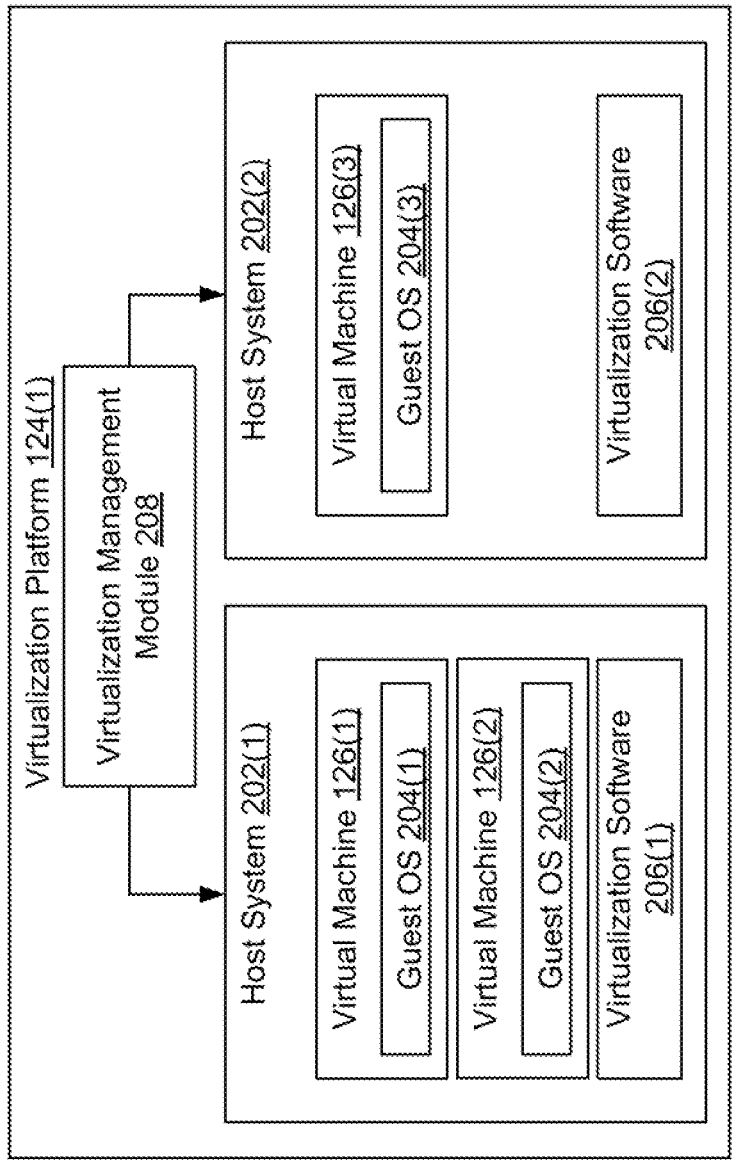
FIG. 2 is a block diagram of a virtualization platform illustrated in FIG. 1.

FIG. 2 is a block diagram of a virtualization platform 124 illustrated in FIG. 1. As shown, the virtualization platform includes the host systems 202 and a virtualization management module ("VMM") 208.

Host system 202 includes hardware for executing virtual machines 126. Virtual machines 126 are, generally, emulations of computer systems or components of computer systems. Virtual machines allow for isolation of systems (by running software for which isolation is desired on different VMs 126), for easy scalability by spawning and decommissioning VMs 126 based on computing demands, and for ease of migration, because VMs 126 may be migrated between different physical computer systems. Each VM typically includes a guest operating system (OS) and virtualized system hardware (not shown) implemented in software to emulate corresponding components of an actual computer system.

Host system 202 may be built on an underlying hardware computing platform comprising one or more computer systems, including one or more central processing units (CPUs), memory chips, interconnects, and the like, and including systems based on different variations of the well-known x86 architecture platforms. Host server system 202 may include one or more virtual machines (VMs) 126 that are each configured to execute a corresponding guest operating system (OS) 204. Virtualization software 206, e.g., ESX®, executes on host server system 202 and manages the VMs 126. Virtualization software 206 may provide certain services to the VMs such as providing a virtual memory runtime environment that presents a specified amount of guest physical memory to each VM, which is configured to appear to be system random access memory. In alternative embodiments, a host operating system configured to include a virtualization system may be implemented instead of virtualization software 206. Exemplary host operating systems include the well-known Linux and BSD Unix.

It should be noted that although host systems 202 are described as including and executing virtual machines, other "contexts," may instead be included and executed. Such contexts may include containers that do not include a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Additional details regarding OS-less containers are included below.

Virtualization management nodule 208 is a computer program that resides and executes in a central server considered a part of virtualization platform 124, or alternatively, running as a VM 126 in one of hosts 202. One example of a virtualization management module is the vCenter® Server product made available from VMware, Inc. of Palo Alto, Calif. Virtualization management module 208 is configured to carry out administrative tasks for the virtualization platform 124, including managing hosts 202, managing VMs 126 running within each host 202, provisioning VMs 126, migrating VMs 126 from one host 202 to another host 202, load balancing between hosts 202, creating resource pools comprised of computing resources of hosts 202 and VMs 126, modifying resource pools to allocate and de-allocate VMs 126 and physical resources, and modifying configurations of resource pools.

Any particular virtualization software 206 can be a "bare-metal" hypervisor, such as vSphere® ESXi™ commercially available from VMware, Inc. of Palo Alto, Calif. Alternatively, one or more of virtualization software 206 can be a hypervisor that executes on top of an operating system (OS), which is executing on a host. Virtualization software 206 provides a software interface layer that abstracts computing hardware resources into virtualized hardware, enabling sharing of the computing hardware resources among virtual machines. Although a particular computer architecture is described for protected virtualization platform 124, other computer architectures may instead or in addition be included without departing from the scope of the present invention.

The hosts 202 in the various virtualization platforms 124 may be located in different physical locations and/or may be associated with different network latencies to central manager 102. Additionally, the different virtualization platforms 124 may comprise different computers or computer networks and may thus have different performance characteristics. Because central manager 102 generally proceeds as fast as the slowest VM 126, the speed with which the configuration/installation operations proceed may be improved by consolidating all VMs 126 in a singe geographic location and under a single virtualization platform 124.

The single geographic location may be the location at which the physical storage device associated with input media 120 is located in order to optimize the data transfer rates for data read from input media 120 and transmitted to VMs 126. In addition, the consolidation operations may consolidate VMs 126 executing in a variety of different types of virtualization platforms 124. In one example, a first virtualization platform 124 is an "on-premise" virtualization platform 124 and a second virtualization platform 124 is an "off-premise" virtualization platform 124. The on-premise virtualization platform 124 may be located at a site that is controlled by a particular business or organization and thus may be considered a private cloud. The off-premise virtualization platform 124 may be located at a site that is not controlled by that business or organization, and thus may be considered a public cloud. The on-premise cloud and off-premise cloud may together constitute a hybrid cloud, in which public cloud services may be utilized to compensate for shortcomings of the private cloud. Thus the consolidation described above may serve to consolidate VMs 126 of a hybrid cloud to a private cloud for parallelization of operations. In other words, the consolidation operation may involve migrating VMs 126 from an off-premise site to an on-premise site.

Figure 3:
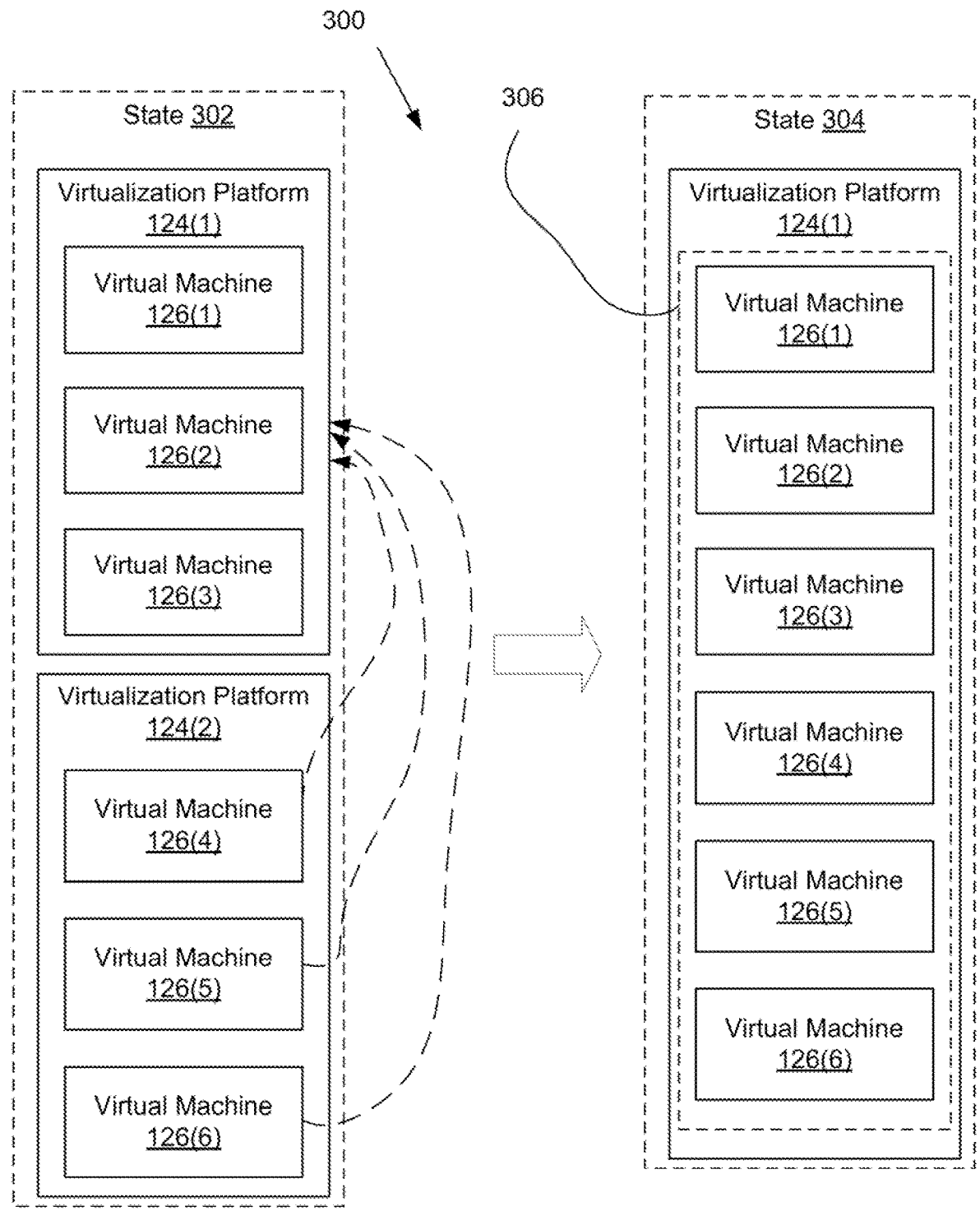
FIG. 3 is a block diagram illustrating a consolidation operation to cause all VMs to operate in the same geographical location and under the same virtualization platform.

FIG. 3 is a block diagram illustrating a consolidation operation 300 to cause all VMs 126 to operate in the same geographical location and under the same virtualization platform 124. As shown, FIG. 3 includes virtualization platform 124(1) and virtualization platform 124(2) in a first state 302 and virtualization platform 124(1) and virtualization platform 124(2) in a second state 304.

In the first state 302, first VM 126(1), second VM 126(2), and third VM 126(3) are operating under first virtualization platform 124(1). Fourth VM 126(4), fifth VM 126(5), and sixth VM 126(6) are operating under second virtualization platform 124(2). In order to consolidate the VMs 126 to improve latency characteristics and thus performance for the installation and configuration operations, VM configuration system 101 migrates all VMs 126 for which the installation and configuration operations are performed to a single virtualization platform 124. VM configuration system 101 may migrate all VMs 126 to a single host 202 or to a collection of hosts that are geographically close together (e.g., within the same data center site) or that have similar latency characteristics to VM configuration system 101. After migrating the VMs 126, VM configuration system 101 proceeds with the installation and configuration operations.

In the example consolidation operation 300 illustrated in FIG. 3, VM configuration system 101 migrates VMs 126 from virtualization platform 124(2) to virtualization platform 124(1). At this point, VM configuration system 101 begins the installation and configuration operations.

Figure 4:
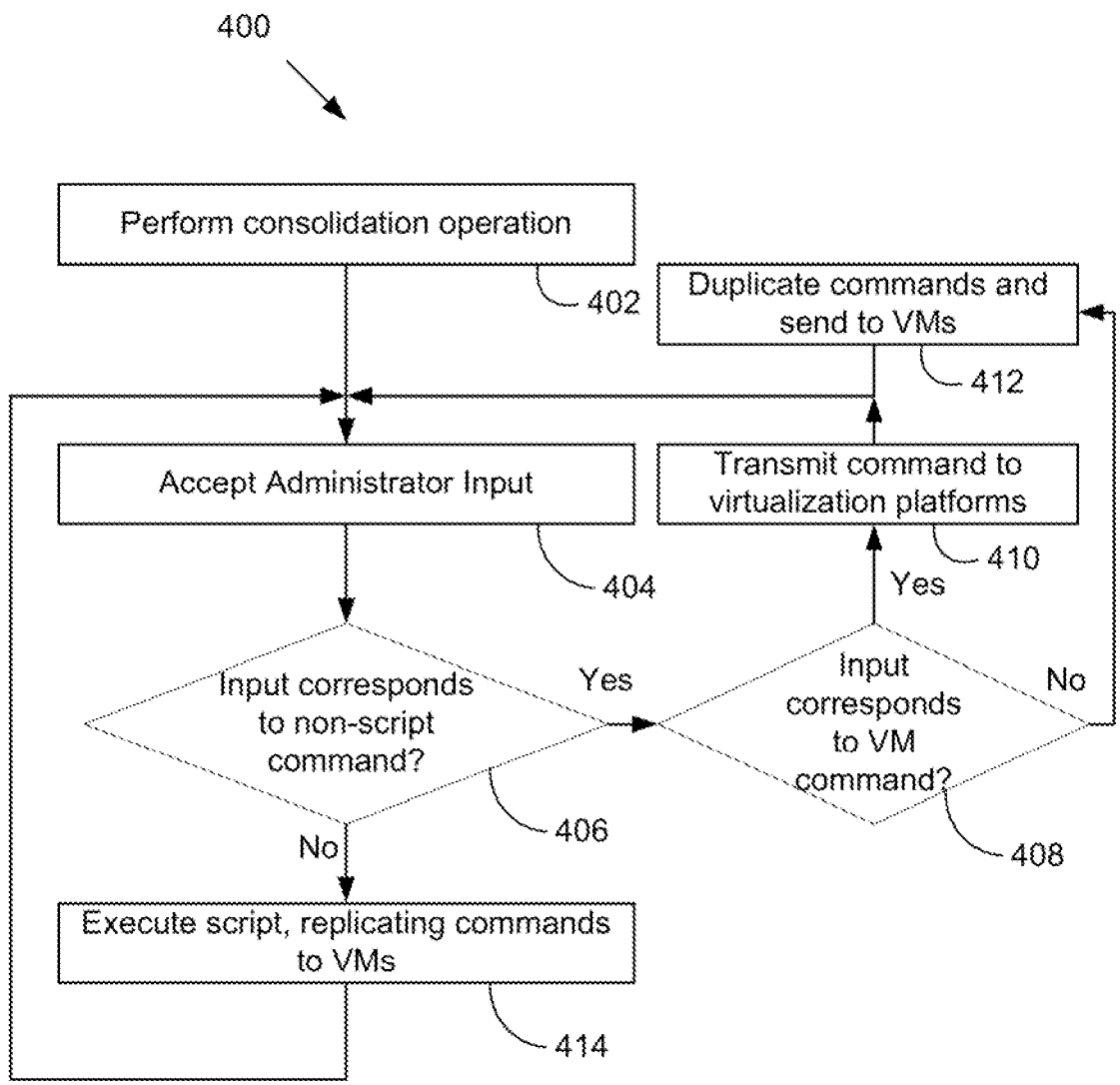
FIG. 4 is a flow diagram of a method for performing configuration operations in a parallel manner, according to an embodiment.

FIG. 4 is a now diagram of a method 400 for performing configuration operations in a parallel manner, according to an embodiment. The method 400 begins at step 402, at which VM configuration system 101 performs a consolidation operation. Performing a consolidation operation involves moving all VMs 126 for which the configuration operations are to be performed to a single virtualization platform 124 and preferably to a single host 202 or to a group of hosts 202 that are geographically close together.

At step 404, VM configuration system 101 accepts administrator input. At step 406, VM configuration system 101 determines whether the input corresponds to a non-script command. If the input corresponds to a non-script command, then method 400 proceeds to step 408 and if the input does not correspond to a non-script command, then method 400 proceeds to step 414. At step 408, VM configuration system 101 determines whether the input corresponds to a VM management command. As described above, a VM management command is a type of command that is concerned with the operation and configuration of VMs 126, as opposed to with the operation of the software executed by VMs 126. If the command is a VM management command, then the method proceeds to step 410 and if the command is not a VM management command, then the command is a VM software command, and the method 400 proceeds to step 412. A VM software command is a command directed to the software executing in a VM 126, and can include commands for controlling input devices. At step 410, VM configuration system 101 transmits the VM management command to the virtualization platforms 124 for execution, after which the method proceeds to step 404. At step 412, VM configuration system 101 duplicates the VM software command and sends the duplicated commands to all VMs 126 for which configuration and installation is being performed. After step 412, the method proceeds to step 404.

Referring back to step 414, which occurs if at step 406, input corresponds to a script command, at step 414, VM configuration system 101 executes the requested script. Executing a script includes executing commands as directed by the script, including duplicating VM software commands encountered, transmitting data from media 120 to the VMs 126, and managing VMs 126 as indicated by VM management commands. The scripts may include conditional statements dependent on the state of the display shown on the VMs 126, in which case image processor 110 would analyze the screen to make the determinations requested by the script.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for parallelizing execution of configuration operations for a plurality of virtual machines, the method comprising:
 identifying a first command for the plurality of virtual machines;

determining that the first command comprises a command from an input device for execution by each virtual machine in the plurality of virtual machines;

replicating the first command for each of the virtual machines in the plurality of virtual machines to generate first replicated commands;

controlling each virtual machine of the plurality of virtual machines according to the first replicated commands via an input/output multiplexer, wherein the configuration of the virtual machines is modified from a first common state to a second common state; and tracking one or more display data frames received from the plurality of virtual machines by the input/output multiplexer, wherein the input/output multiplexer waits for all of the plurality of virtual machines to advance to a next display data frame.

2. The method of claim 1, wherein:

the input/output multiplexer is configured to interface with a virtual machine remote console application programming interface.

3. The method of claim 1, further comprising:

identifying a second command for the plurality of virtual machines;

determining that the second command comprises a virtual machine management command for managing the plurality of virtual machines; and controlling each virtualization platform associated with the plurality of virtual machines according to the second command.

4. The method of claim 3, wherein controlling each virtualization platform comprises:

generating a set of translated commands based on the second command via one or more virtualized platform application programming interfaces; and controlling the plurality of virtual machines based on the set of translated commands.

5. The method of claim 1, further comprising:

prior to identifying the first command, determining that a parallelized configuration operation is initiated;

in response to determining that the parallelized configuration operation is initiated, causing the virtual machines of the plurality of virtual machines to execute at a single geographic location.

6. The method of claim 5, wherein causing the virtual machines to execute at a single geographic location comprises:

identifying virtual machines of the plurality of virtual machines that are executing in an off-premise location; and migrating the identified virtual machines to an on-premise location.

7. The method of claim 1, further comprising:

receiving display information from each of the virtual machines; and combining the received display information to generate a consensus display.

8. The method of claim 7, wherein:

a script includes a conditional statement configured to cause a second command to be executed conditionally based on a state associated with the consensus display, and the method further comprises:

analyzing the consensus display based on the conditional statement; and based on the analyzing, determining whether to replicate the second command to generate second replicated commands and control each virtual machine of the plurality of virtual machines according to the second replicated commands.

9. The method of claim 1, further comprising:

identifying a second command configured to access input media coupled to the input/output multiplexer;

attaching the input media to the plurality of virtual machines as a virtual media;

accessing data in the input media according to the second command; and transmitting the data to each virtual machine of the plurality of virtual machines.

10. The method of claim 1, wherein the command from the input device comprises mouse click or release or a keyboard key press or release.

11. A method for parallelizing execution of operations for a plurality of virtual machines, the method comprising:

in response to receiving a command for mapping one or more virtual machines to an input/output multiplexer, mapping the one or more virtual machines to the input/output multiplexer;

combining, via the input/output multiplexer, display data that are output from virtual machines mapped to the input/output multiplexer to generate combined display data;

displaying the combined display data from the plurality of virtual machines on a virtual machine console display;

in response to receiving a command from an input device, duplicating the command from the input device to generate duplicated commands;

providing the duplicated commands to the virtual machines mapped to the input/output multiplexer, wherein the configuration of the virtual machines is modified from a first common state to a second common state; and tracking one or more display data frames received from the plurality of virtual machines by the input/output multiplexer, wherein the input/output multiplexer waits for all of the plurality of virtual machines to advance to a next display data frame.

12. The method of claim 11, wherein:

the display data that is combined to generate the combined display data excludes display data from virtual machines not mapped to the input/output multiplexer; and the duplicated commands do not include commands for virtual machines not attached to the input/output multiplexer.

13. The method of claim 11, wherein:

a first subset of the virtual machines mapped to the input/output multiplexer are included in an on-premise data center and a second subset of the virtual machines mapped to the input/output multiplexer are included in an off-premise data center.

14. The method of claim 13, further comprising:

migrating the virtual machines mapped to the input/output multiplexer and included in the off-premise data center to the on-premise data center prior to combining the display data and duplicating the command from the input device.

15. The method of claim 14, further comprising:

migrating the virtual machines that are migrated to the on-premise data center back to the off-premise data center after parallelized execution of operations is complete.

16. The method of claim 11, wherein:
the command from the input device is included within a script; and
the method further comprises: duplicating commands included in the script to generate duplicated script commands; and transmitting the duplicated script commands to the virtual machines attached to the input/output multiplexer for processing.

17. The method of claim 11, further comprising:
receiving a command to read data stored in input media attached to the input/output multiplexer; and
transmitting data stored in the input media to the virtual machines attached to the input/output multiplexer.

18. A system for parallelized execution of configuration operations for a plurality of virtual machines, the system comprising:
a central virtual machine console management module comprising:
a configuration manager, and
a virtual machine console display; and
an input/output multiplexer coupled to the configuration manager, and to the virtual machine console display,
wherein the input/output multiplexer is configured to:
in response to receiving a command for mapping one or more virtual machines to an input/output multiplexer, map the one or more virtual machines,
combine display data that are output from virtual machines mapped to the input/output multiplexer to generate combined display data from the plurality of virtual machines on the virtual machine console display,
in response to receiving a command from an input device from the configuration manager, duplicate the command from the input device to generate duplicated commands,
provide the duplicated commands to the virtual machines mapped to the input/output multiplexer, wherein the configuration of the virtual machines is modified from a first common state to a second common state,
track one or more display data frames received from the plurality of virtual machines by the input/output multiplexer, wherein the input/output multiplexer waits for all of the plurality of virtual machines to advance to a next display data frame.

19. The system of claim 18, wherein:
the display data that is combined to generate the combined display data excludes display data from virtual machines not mapped to the input/output multiplexer; and
the duplicated commands do not include commands for virtual machines not attached to the input/output multiplexer.

20. The system of claim 18, wherein:
a first subset of the virtual machines mapped to the input/output multiplexer are included in an on-premise data center and a second subset of the virtual machines mapped to the input/output multiplexer are included in an off-premise data center; and
the central virtual machine console management module includes a virtual machine operations module configured to migrate the virtual machines mapped to the input/output multiplexer and included in the off-premise data center to the on-premise data center prior to combining the display data and duplicating the command from the input device.

* * * * *